United States Patent [19]

Klann

[11] Patent Number: 5,456,371

[45] Date of Patent: Oct. 10, 1995

[54] LIFTING BRIDGE FOR INSTALLING AND REMOVING OF MOTOR VEHICLE PARTS

[76] Inventor: Horst Klann, Terra Wohnpark 12, D-78052 Villingen-Schwenningen, Germany

[21] Appl. No.: 198,311

[22] Filed: Feb. 18, 1994

[30] Foreign Application Priority Data

Feb. 19, 1993 [DE] Germany .......................... 9302395.2 U

[51] Int. Cl.$^6$ .................................................. B66C 17/06
[52] U.S. Cl. ........................ 212/338; 180/298; 212/180; 212/314; 212/316
[58] Field of Search .................................. 212/179, 208, 212/210, 218, 220, 135, 140, 142.1, 180; 180/294, 298

[56] References Cited

U.S. PATENT DOCUMENTS

| | | | |
|---|---|---|---|
| 832,058 | 10/1906 | Hicks | 212/225 |
| 1,333,200 | 3/1920 | Beatty | 254/311 |
| 1,699,587 | 1/1929 | Grenier | 212/142 |
| 1,952,238 | 3/1934 | Dice | 212/218 |
| 2,410,979 | 11/1946 | Kirton | 212/210 |
| 2,848,120 | 8/1958 | Harmon | 212/135 |
| 2,995,094 | 8/1961 | Wallace | 212/208 |
| 3,768,676 | 10/1973 | Spitzer | 214/392 |
| 4,030,705 | 6/1977 | Bontrager | 254/139 |
| 4,774,386 | 9/1988 | Goodwin | 180/298 |
| 4,928,927 | 5/1990 | Frederick et al. | 254/279 |

FOREIGN PATENT DOCUMENTS

| | | | |
|---|---|---|---|
| 2506806 | 9/1981 | France | E03F 5/02 |
| 269095 | 1/1914 | Germany | 64/46 |
| 8627720 | 8/1987 | Germany . | |
| 3732837 | 6/1990 | Germany . | |

*Primary Examiner*—F. J. Bartuska
*Assistant Examiner*—Thomas J. Brahan
*Attorney, Agent, or Firm*—McGlew and Tuttle

[57] ABSTRACT

The lifting bridge is used to install and remove motor vehicle parts and is provided with a support frame (1), which has support straps (7) with support feet (5, 6), by which the support frame can be supported at the edges of an engine space opening (43) of the car body, at both ends of a telescopically extendable support rail (8, 18). The support frame is provided with two lifting devices (10), which are guided individually displaceably on the support frame (8, 18) and each has a lifting member (12), which can be raised and lowered by a rotating actuation and can be stopped in its position by automatic interlocking. The support frame (1) consists of two telescopically extendable support rails (8, 8', 18, 18'), which extend in parallel to and at laterally spaced locations from one another, and on which the lifting devices (10) are guided by means of guide tubes (11) in a positive-locking manner. The lifting devices (10) have a flexible pulling member (12) each, which is led through between the support rails (8, 8', 18, 18'), and which can be actuated by means of a worm gear mechanism (19) of the lifting device (10), which is self-locking in the direction of pull.

10 Claims, 3 Drawing Sheets

LIFTING BRIDGE FOR INSTALLING AND REMOVING OF MOTOR VEHICLE PARTS

FIELD OF THE INVENTION

The present invention pertains to a lifting bridge for installing and removing motor vehicle parts with a support frame, which has—at both ends of a telescopically extendable support rail—support straps with support feet, by which it can be supported at the edges of an engine space opening of the vehicle body, and with two lifting devices, which are guided individually displaceably on the support frame and each of which has a lifting member, which can be raised and lowered by rotary actuation and can be locked in its position by automatic interlock.

BACKGROUND OF THE INVENTION

In a prior-art lifting bridge of this type (DE 86,27,720 U 1), the lifting members consist of vertical threaded spindles, which are arranged laterally at a support rail and can be lowered into an engine space opening by rotary actuation of a winged nut. The support rail consists of a rectangular tube, over which a guide tube carrying a lifting device is pushed nonrotatably but axially displaceably in a positive-locking manner. The threaded spindles are each arranged laterally next to the support rail, so that an overturning moment, which is able to lift the lifting bridge as a whole out of its anchoring at the edges of the fender, is generated when a load is suspended at the lower ends of the threaded spindles. In addition, a very strong clamping action is generated by the overturning moment between the support rail and the guide tube, which makes it very difficult, if not impossible, for the lifting device to be axially displaced under load. Moreover, the threaded spindles, which are rigid per se, permit a movement of the loads attached to them only in the vertical direction and along the support rail; movement of the load at right angles thereto is not possible. The maximum working stroke is also limited. This prior-art lifting bridge therefore has only limited applications and is unsuitable, e.g., for the floating suspension of a V-type engine for removing or installing its transmission.

Another lifting device, which supports a load from below and is suspended in the lateral leaf spring assemblies of, e.g., a truck, has been known from DE 37,32,837 C2. This device has only one, centrally arranged, vertical threaded spindle, which is led through the support frame, with an upper support plate, on which a load can be placed from the top. Even though this lifting device permits the central supporting of the load, the point of support itself is determined essentially nondisplaceably in the center of the motor vehicle due to the three-part support frame, which can be displaced laterally only slightly.

SUMMARY AND OBJECTS OF THE INVENTION

In view of the drawbacks of tile state of tile art, tile object task of the present invention is to provide a lifting bridge of the type described in the introduction, in which both higher stability and a longer working stroke, as well as an easier lateral displaceability of the lifting devices under load along the support frame are guaranteed, and in which the support members at the lifting devices are so flexible that they readily make possible displacements of the suspended load in all directions even over greater distances.

This object is attained according to the present invention by the support frame comprising two telescopically extendable support rails extending at laterally spaced locations in parallel to one another, on which support rails the lifting devices are guided by means of guide tubes in a positive-locking manner, and by the lifting devices having a flexible pulling member passed through between the support rails, which can be actuated by means of a worm gear mechanism of the lifting device, which worm gear mechanism is self-locking in the direction of pull.

The flexible pulling member passed through between the support rails avoids overturning moments and guarantees a high degree of stability, along with a lightweight construction of the lifting bridge. Since the pulling member may have any desired length, the working stroke, which depends on it, can also be freely selected. The lifting devices guided on guide tubes lead to an easy lateral displaceability of the lifting devices on the support frame.

The embodiment of the present invention wherein the worm gear mechanism is provided formed of a worm rotatable around a vertical axis and a worm wheel rotatable around a horizontal axis, both of which are mounted in a closed housing and the worm is provided with a wrench head projecting from the housing on the top side, leads to a great reduction of force, which makes it possible to lift heavy loads or to rotate the worm at a low expenditure of force. In addition, the wrench head, which can be actuated, e.g., with a crank, is also easily accessible as a result, and reliable self-locking of the gear mechanism, which reliably prevents the spontaneous downward movement of the pulling members under load, is guaranteed.

The embodiment of the present invention wherein the worm wheel is connected to the chain wheel and the flexible pulling member is a link chain which engages the chain wheel in the positive-locking manner, also guarantees, along with high tensile strength, a high degree of flexibility of the pulling members, by which the load suspended on them can easily be displaced floatingly in all directions.

Reliable chain guiding and handling, which must definitely be ensured for safety engineering reasons, are guaranteed by the embodiment of the invention wherein an approximately semicircular chain guide is arranged in the housing above the chain wheel.

The embodiment of the invention including vertical support straps which are rigidly connected to free ends of the two support rails, are mounted on essentially vertical support legs in a pendular manner around an essentially horizontal pendulum axis by means of mutually coaxial pendulum joints makes it possible to adjust the support feet to the predetermined oblique positions of the support surfaces of the body such that the support rails are located in a horizontal position in the position of use, so that the risk of overturning of the support frame is avoided.

The embodiment of the invention wherein the lower ends of the support legs are provided with support feet, each of which is adjustable around essentially vertical pivot axes of the support legs also serves the purpose of stabilizing the position of the frame by the support feet being adaptable to the actual shape of the support surface at the edge of the engine hood opening.

The embodiment of the invention wherein the support feet have downwardly directed projections, which are arranged asymmetrically in relation to the pivot axes and are provided with soft non-slip shoes, ensures stable fixation of the support feet at the support straps, which is significant especially in the case of oblique position of the support feet, due to the generation of an additional clamping action at the lever arm of the support foot.

Finally, the embodiment of the invention wherein the two support rails are formed of rectangular, particularly square tubes, which are guided displaceably one inside the other and are fastened to support straps such that one of their diametrical planes extends at least approximately vertically in the position of use make it possible to achieve good clamping connections without additional components, as well as better stability of guiding and especially larger contact surfaces between the guide tubes and the support rails, which in turn lead to easier displaceability of the lifting devices on the support frame.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
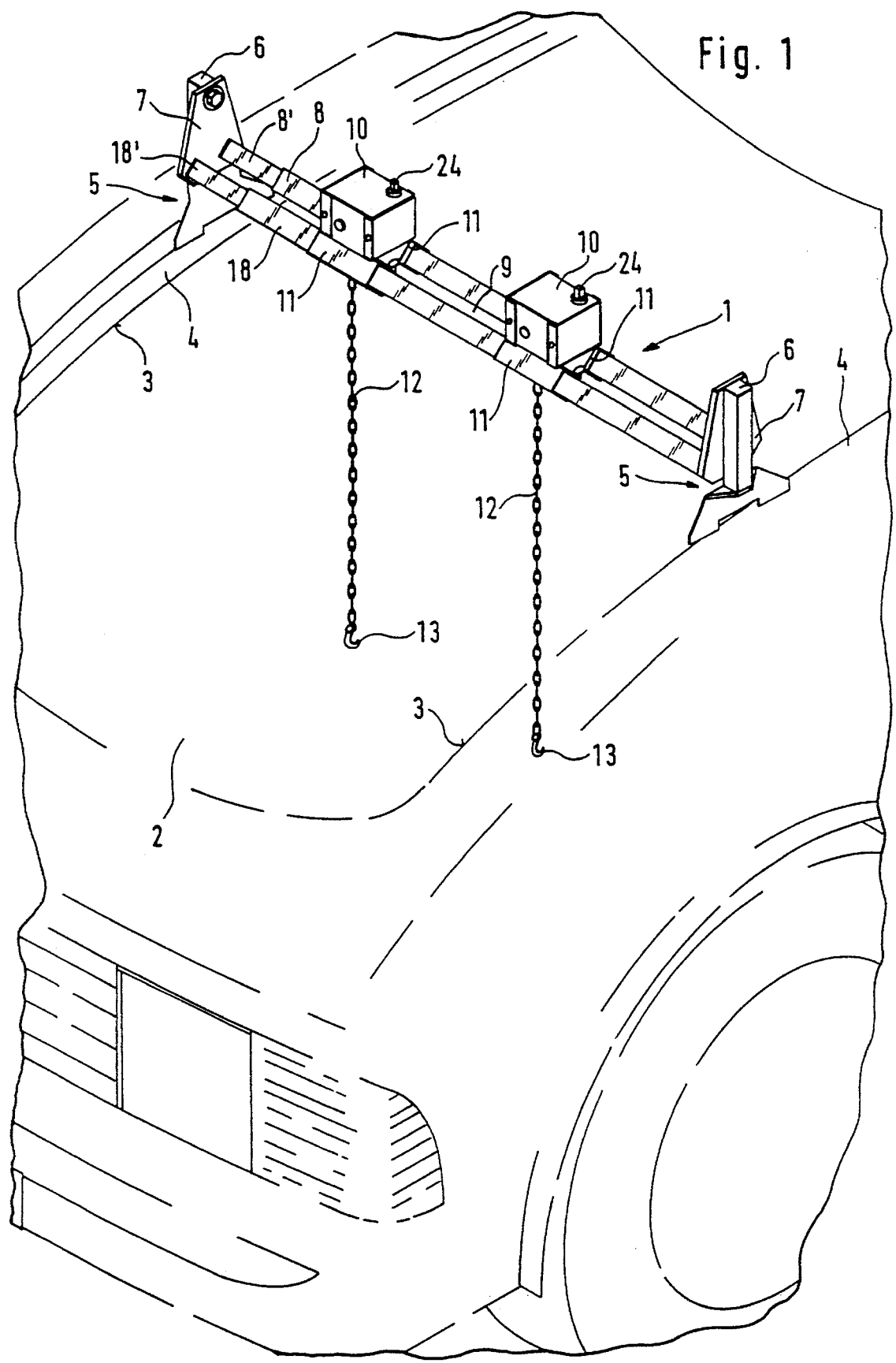
FIG. 1 is a perspective view of a lifting bridge in use above the engine space opening of a motor vehicle.

FIG. 1 shows a lifting bridge in use above the engine space opening 2 of a motor vehicle, in which the engine hood has been removed or raised.

Fender grooves 4, in which the support feet 5 of the lifting bridge 1 are supported, extend at the edges 3 of the engine hood opening 2 in the longitudinal direction of the vehicle. The support feet 5 are connected to support straps 7 via vertical support legs 6. Two support rails 8 and 18 as well as 8' and 18', which are aligned in parallel to one another at spaced locations, and between which a space 9 is located, are welded to the two, essentially trapezoidal support straps 7. The support rails 8 and 8' as well as 18 and 18' used here each consist of tubes with square cross sections, and the support rails 8' and 18' are telescopically pushed into the support rails 8 and 18 with an easy snug fit. As a result, tile length of tile lifting bridge 1 can be adjusted to the greatly varying widths of the engine space openings 2 of a plurality of types of motor vehicles.

Instead of the square tube profiles preferred here, it is also possible to use rectangular or round tube profiles. The two support rails 8, 8' and 18, 18' are advantageously fastened to the support straps 7 such that one of their diametrical planes 32 extends at least approximately vertically in the position of use. This leads to better stability of guiding and especially to a larger contact surface between the guide tubes 11, which will be described in greater detail below, and the support rails 8 and 18, as a result of which easier displaceability of two lifting devices 10 mounted on the support rails 8, 18 is achieved even under load.

The two lifting devices have an identical design. Each of the lifting device 10 has two parallel guide tubes 11 of square cross section, which are arranged at suitably spaced locations from one another, and which fittingly surround the support rails 8 and 18 in a positive-locking manner, so that the lifting devices 10 are displaceably guided essentially over their entire length on the support rails 8 and 18. Each of the lifting device 10 is provided with a worm gear mechanism 31, which is represented in detail in FIGS. 2 and 4, for actuating the flexible pulling member 12, whose downwardly hanging sections are led through the space 9 between the support rails 8 and 18.

The pulling member 12 is a link chain with a hook 13 attached to its lower end. Instead of a link chain, it would also be possible to use a cable in another embodiment of the lifting device.

The advantage of the use of a flexible pulling member 12 is the possibility of horizontally displacing the load suspended thereon in all directions in order to obtain fastening points on a motor vehicle part, e.g., an engine, which are laterally offset, in order to remove or install the transmission.

The guide tubes 11 are pushed onto and all around the support rails 8 and 18 in a positive-locking manner, and they are easily displaceable on them. They carry, in pairs, a lifting device 10. The lifting devices 10 each consist of a housing 43, which is arranged centrally seated on the two guide tubes 11. The housing 43 is formed by a housing part 40 bent at right angles in the shape of a U, with a horizontal upper cover wall 44, a front side wall 41 and a rear side wall 42, which are welded to the guide tubes 11 and are provided with a housing bottom 35. On tile front side, tile housing 43 is closed by two attached front walls 48, 49. In tile area between tile two support rails 8, 18, tile housing bottom 35 has two perforations 33, 34, through which the two sections of the link chain 12, which hang down freely, are led. The end of the link chain 12 located opposite the hook 13 is provided with a locking member 25, which prevents the link chain 12 from moving unintentionally out of the housing 43.

The link chain 12 is guided in a positive-locking engagement over a chain wheel 21, which is mounted rotatably around tile horizontal axis of rotation 26 in tile housing 43.

In tile case of a possible alternative use of a cable as a flexible pulling member, a corresponding cable drum would have to be provided instead of the chain wheel 21.

The chain wheel 21 is a one-piece component of a worm wheel 28, which is in gear connection with a worm 22. The worm 22 is mounted on a worm shaft 23, which has a wrench head 24, which projects from the housing on the top side, and to which a crank can be attached with a hexagon rotating wrench to actuate the worm gear mechanism 31. The link chain 12 with the hook 13 attached to it can be lowered into tile engine space by a rotary actuation of the wrench head 24. An engine part, a transmission or another object can be suspended on the two hooks 13 of the lifting devices 10. The lifting devices 10 may also be displaced on the support rails 8 and 18 if desired.

Self-locking gear engagement between the worm 21 and the worm wheel 28 is important in the worm gear mechanism 31. This self-locking gear engagement ensures that the chain wheel cannot rotate unintentionally, i.e., without intended manual actuation of the worm shaft even under the heaviest load. The load hanging on one or both link chains can thus be held suspended reliably in any desired position and be displaced laterally if desired.

An approximately semicircular chain guide element 29 is attached to the underside of the cover wall 44 and is arranged in the housing 43 directly above the chain wheel 21. It guarantees reliable guiding of the link chain in the area of engagement with the chain wheel 21, so that reliable function and handling of the lifting device 10 are achieved.

Figure 2:
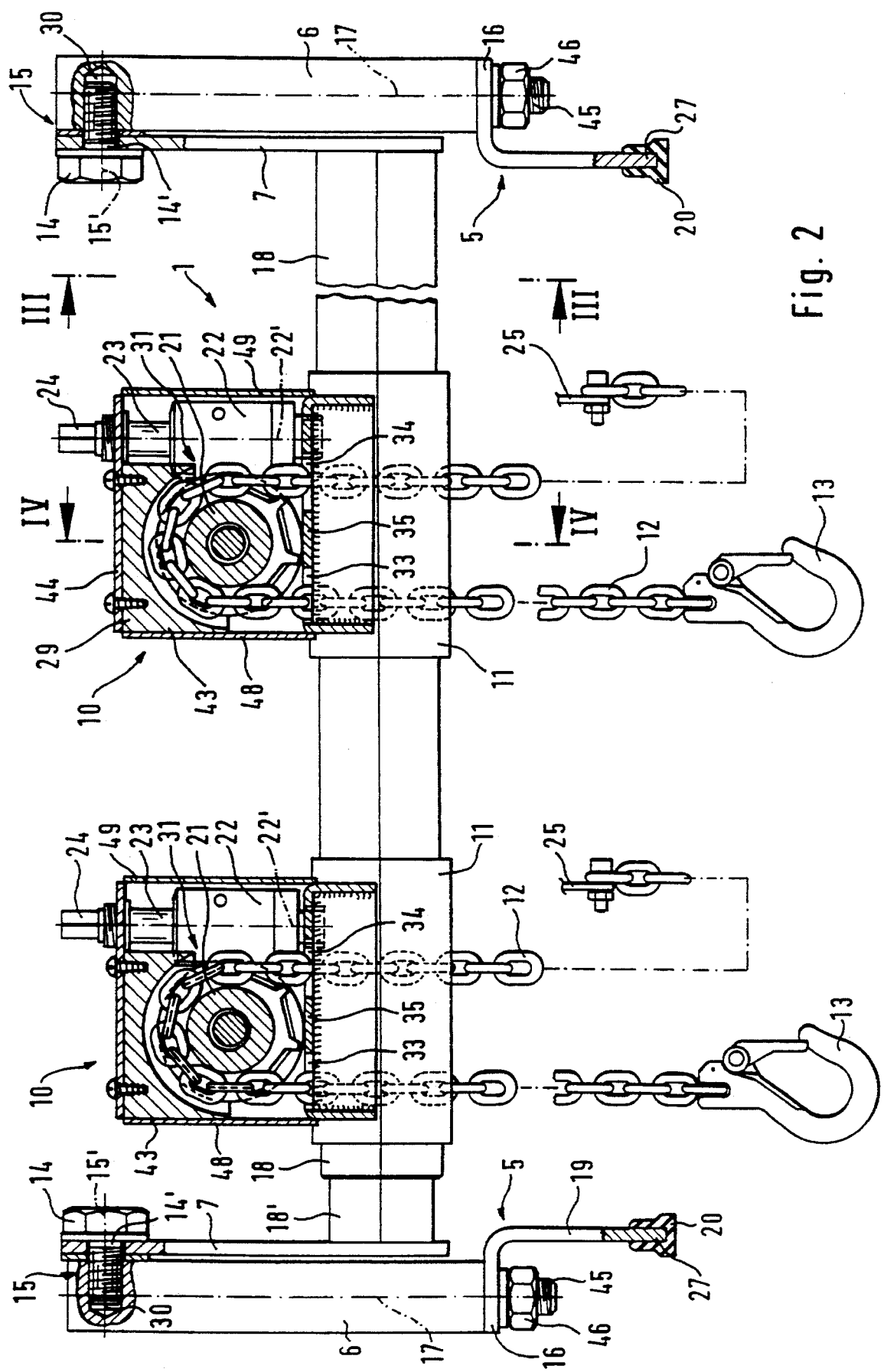
FIG. 2 is a partial sectional front view of the lifting bridge according to FIG. 1.
Figure 3:
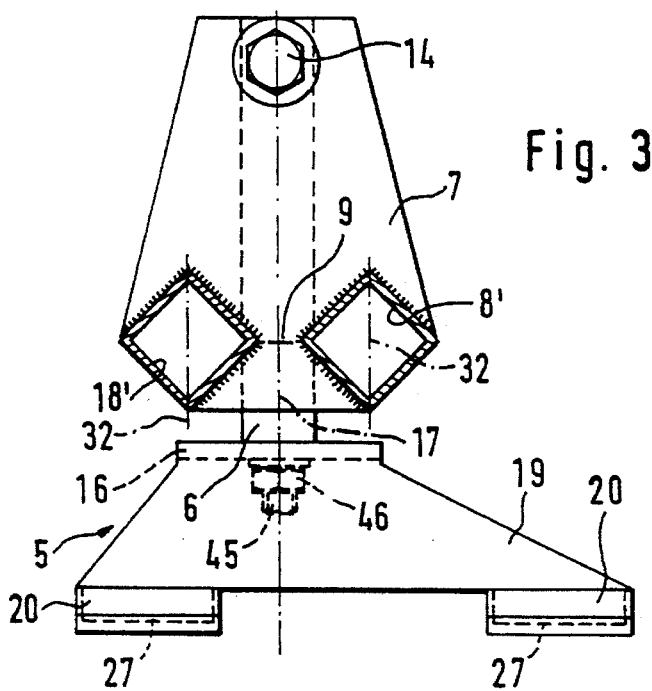
FIG. 3 is a top view of a lifting device of the lifting bridge according to FIG. 2.
Figure 5:
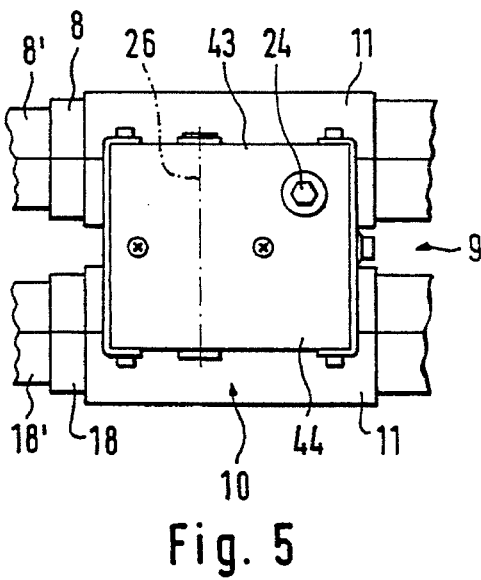
FIG. 5 is a top view of a lifting device of the lifting bridge according to FIG. 2.

Of the total of the four support rails 8 and 18 as well as 8' and 18', FIG. 2 shows only the two front support rails 18 and 18' pushed one into another. These are welded at their ends to the support straps 7.

A pendular support means is formed by the support straps 7 fastened in a pendular manner to a support leg 6 by mutually coaxial setscrews 14, which have a cylindrical bearing projection 14' each. The setscrews 14, screwed firmly into horizontal threaded holes 30, each form pendulum joints 15 with a common, horizontal pendulum axis 15', around which the support straps 7 with the support rails 8, 8' and 18, 18' are loosely pivotable. As a result, possible oblique positions of the fender grooves 4, in which the support feet 5 are supported, can be automatically compensated. As is apparent from the graphic representation, the setscrews 14 with their coaxial pendulum axes 15' are arranged so far above the support rails 8, 8' and 18, 18' that their overall center of gravity is always under the pendulum axis 15' even when the lifting devices 10 are taken into account.

The two support legs 6 are each screwed to a horizontal leg 16 of a angular plate-like support foot 5 by a threaded nut 46 screwed onto a threaded pin 45 extending downwardly on the front side. As a result, the support feet 5 can be pivoted around the vertical pivot axis 17 in relation to the lifting bridge 1. This also makes it possible to arrange the lifting bridge 1 in a position that is oblique or diagonal to the support rails 8, 18 above the engine space opening 2.

The approximately trapezoidal vertical legs 19 of the support feet 5 are covered on the underside projections 27 with shoes 20, which ensure a soft and non-slip contact and can be inserted into the fender grooves 4 fittingly and in a slip-free manner.

The projections 27 with the shoes 20 are arranged asymmetrically in relation to the pivot axis 17, so that another offset position of the shoes 20 will be obtained on pivoting a support foot 5 by 180°. As a result, it is easily possible to avoid placing the shoes 20 on screw heads which may be present in a fender groove 4, without the need to leave the optimal working position of the support rails 8, 18.

Since the link chains 12 are led through the space 9 between the support rails 8 and 18, overturning moments can be reliably prevented from occurring at the support rails 8, 18 when a load is suspended on the link chains 12.

Figure 4:
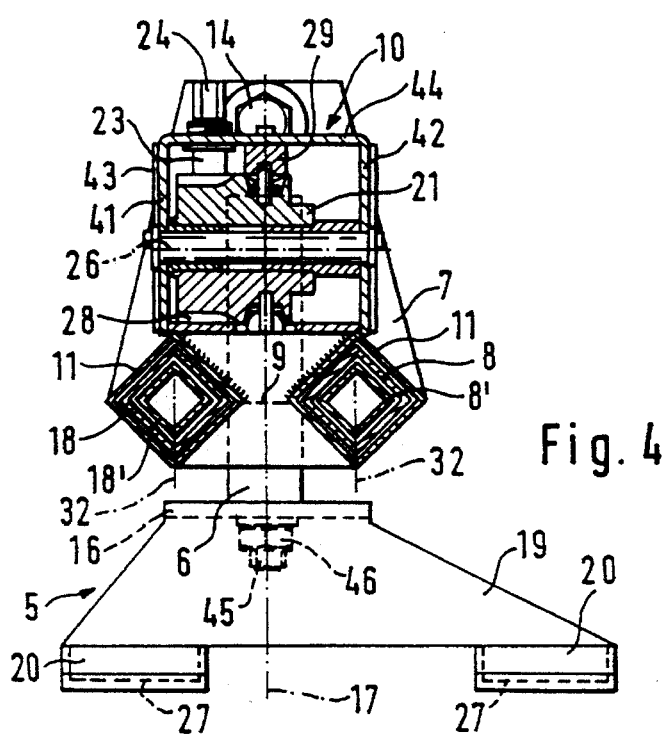
FIG. 4 is a partial sectional side view of the lifting bridge according to FIG. 2.

The position of the support rails 8, 8' and 18 and 18' shown in FIG. 4, in which one of their diametrical planes 32 extends at least approximately vertically in the position of use, offers the advantage that the contact surfaces between the guide tubes 11 and the support rails 8, 18, which are in contact with one another under load, are considerably increased. These contact surfaces substantially facilitate the displaceability of the lifting devices 10 on the support rails 8, 18.

What is claimed is:

1. Lifting bridge for installing and removing motor vehicle parts, comprising:

support frame means including first and second telescopically extendable support rails, said first and second telescopically extendable support rails extending in parallel to one another at laterally spaced locations and a first support strap and a second support strap and support feet for supporting the telescopically extendable support rails at edges of an engine space opening;

first and second lifting means guided individually displaceably on said support frame means, each said lifting means having a lifting device which can be raised and lowered by a rotating actuation and can be stopped in a position by automatic interlock, said lifting device including a worm gear mechanism which is self locking in a direction of a pull;

guide tubes for guiding said lifting device means on said telescopically extendable support rails in a positive locking manner, each said lifting means including a flexible pulling member, led through said support rails;

essentially vertical support legs, said vertical support straps being rigidly connected to free ends of said two support rails, mounted on said essentially vertical support legs in a pendular manner around an essentially horizontal pendulum axis by means of mutually coaxial pendulum joints.

2. Lifting bridge according to claim 1, wherein:

said worm gear mechanism is formed of a worm rotatable around a vertical axis and a worm wheel rotatable around a horizontal axis, said worm and worm wheel being mounted in a closed housing, said worm being provided with a wrench head projecting from said housing on a top side.

3. Lifting bridge according to claim 2, wherein:

said worm wheel is connected to a chain wheel and said flexible pulling member is a link chain which engages said chain wheel in a positive-locking manner.

4. Lifting bridge according to claim 3, wherein:

all approximately semicircular chain guide is arranged in said housing above said chain wheel.

5. Lifting bridge according to claim 1, wherein:

lower ends of said support legs are provided with said support feet, each of said support feet being adjustable around an essentially vertical pivot axis of said support legs.

6. Lifting bridge according to claim 5, wherein:

said support feet have downwardly directed projections arranged asymmetrically in relation to said essentially vertical pivot axis and are provided with soft, nonslip shoes.

7. Lifting bridge according to claim 1, wherein:

said two support rails are formed of rectangular, essentially square tubes which are guided displaceably one inside the other and are fastened to said support straps such that one of their diametrical planes extends at least approximately vertically in the position of use.

8. A lifting bridge comprising:

first and second support feet mountable at edges of an engine space opening of a vehicle body;

first and second support legs extending from said first and second support feet respectively;

a support frame positioned between said first and second support legs, said support frame including first and second support rails positioned substantially parallel to each other and having telescoping portions;

a lifting means positioned on said first and second support rails and for lifting objects to said support frame, said lifting means including a flexible pulling member extending through said first and second support rails to the object;

first and second pendular support means for supporting said support frame and said lifting means in a pendular manner from said first and second support legs, said pendular support means maintaining a plane of said support frame substantially perpendicular to a lifting force exerted by said lifting means independent of a vertical position of said first and second support leg and a direction of said lifting force.

9. A bridge in accordance with claim 8, wherein:

said first and second pendular support means includes first and second pendulum joints on said first and second support legs respectively, and also includes first and second support straps pivotally connected at one end to said first and second pendulum joints respectively, each of said first and second support straps being fixed at another end to opposite ends of said first and second support rails, said another end of said first and second support straps being spaced from said one end of said first and second support straps.

10. A bridge in accordance with claim 9, wherein:

said first and second pendulum joints are spaced from a center of gravity of said support frame and said lifting means.

* * * * *